United States Patent Office 3,256,365
Patented June 14, 1966

3,256,365
COMPOSITION COMPRISING POLYETHYLENE AND OXIDATION PRODUCTS OF POLYETHYLENE AND ARTICLES THEREOF
Leon E. Wolinski, Buffalo, N.Y., assignor to E. I. du Pont de Nemours and Company, Wilmington, Del., a corporation of Delaware
No Drawing. Filed June 20, 1956, Ser. No. 592,500
8 Claims. (Cl. 260—897)

This invention relates to the manufacture of polyethylene structures and coatings. More particularly it relates to the preparation of polyethylene film suitable for conversion to bags, containers and similar packages.

One of the disadvantages of polyethylene film in the packaging field resides in its low adhesiveness to dried ink impressions, polymeric coatings, other substrates such as glass, wood, paper, and thermoplastic films other than polyethylene. The result is that any information imprinted on the surface of the polyethylene film such as instructions, advertising, trademarks or recipes are smeared or rubbed off by the normal abrasion suffered by the film during handling. This shortcoming has been substantially overcome by so-called printability treatments described in U.S. Patents 2,502,841; 2,632,921; 2,648,097; 2,668,134; 2,715,075; 2,715,076; 2,715,077 and several patent applications disclosed hereinafter. However, these treatments in turn have caused another problem. The ability of polyethylene to adhere to itself by the application of pressure and heat, i.e. heat-sealability, necessary in converting the film to packages, although satisfactory prior to the printability treatment, falls below satisfactory levels after treatment.

The object of the present invention is to provide a polyethylene structure, particularly film, having improved properties. Another object is to improve the heat-sealability of polyethylene structures without sacrificing the desirable properties of the polyethylene structures. Another object is to provide polyethylene structures and polyethylene coatings having a high level of adhesiveness to printing inks and the like, that can be easily heat-sealed. A more specific object is to provide a polyethylene composition, which when formed into a structure or used as a coating and subjected to a printability treatment, will provide a printable and heat-sealable structure. Other objects will appear hereinafter.

The objects are accomplished by a structure formed from a polyethylene resin having a weight average molecular weight of 15,000–3,000,000 (normally from 200,000 to 1,500,000) and containing a small amount, i.e. at least about 0.1% and preferably not more than about 10% based on the weight of the polyethylene resin, of at least one oxidation product of polyethylene, the oxidation product having a softening temperature no greater than the lower temperature of the crystalline melting point range of the polyethylene resin, preferably below 100° C., an average normal boiling point above the optical melting point of the polyethylene resin, preferably above 325° C., and a melt viscosity, at a temperature above 110° C., lower than that of the polyethylene resin.

Because of the nature of the oxidation products of polyethylene, as described hereinafter, it is only possible to specify a softening temperature rather than a melting point. The softening temperature is determined by placing a chip of the additive on a highly polished copper block and raising the temperature of the block uniformly. The lowest temperature at which the additive sample leaves a molten trail when moved across the block by applying light pressure with a spatula is the softening temperature.

Likewise, the nature of the polyethylene resin makes it impossible to define a crystalline melting point. Instead, a crystalline melting point range is observed. This extends from a lower temperature at which crystallites begin to disappear to the so-called optical melting point at which crystallites are no longer detectable.

The oxidation product is preferably blended uniformly into the polyethylene composition prior to extrusion. However, the oxidation product may be incorporated into the polyethylene resin at any stage during formation of the polyethylene structure or it may be added to the surface of the polyethylene structure after formation.

The oxidation products of polyethylene are carboxylic compounds, hydroxy compounds, partially esterified hydroxydicarboxylic acids and the like. These products are produced by partially oxidizing polyethylene, the polyethylene originally having a weight average molecular weight of 1000 or above but preferably below 5000, in the manner described by Whittaker and Forsyth in British Patent No. 581,279. The weight average molecular weight of the resulting oxidation products is usually below 5000 and the molecular weight distribution is much wider than that of the polyethylene starting material. In general, the oxidizing procedure comprises heating the polyethylene at a temperature of 60° C.–250° C. in contact with air alone, with oxygen, with a mixture of oxygen and ozone or with an aqueous solution containing 35%–85% nitric acid. Other oxidizing agents which may be used include per-compounds such as peroxides and per-salts and those which readily liberate oxygen on heating. These include hydrogen peroxide, benzoyl peroxide, diethyl peroxide, ammonium persulphate, sodium hypochlorite, potassium chlorate, chromic acid and potassium permanganate. Mixtures of oxidizing agents such as nitric acid and chromic acid may also be used. Oxygen carriers or catalysts may be used to facilitate the oxidation of ethylene polymers by air or oxygen. These include ammonium vanadate, turpentine, benzaldehyde, and salts, especially fatty acid salts and naphthenic acid salts, of cobalt, lead and manganese. These may be used in any of the above methods of oxidation, and have the effect of increasing the rate of reaction.

The limitations on the oxidation products were mentioned previously. These products must have a softening temperature no graeter than the lower temperature of the crystalline melting point range of the polyethylene resin used, an average normal boiling point above the optical melting point of the polyethylene resin used and a melt viscosity less than that of the polyethylene resin when measured at a temperature above 110° C., i.e. 110° C.–250° C. Obtaining products having these properties will depend on the particular starting ethylene polymer and the manner in which it is oxidized including the partial oxidation procedure, the temperature used and the duration of the oxidation treatment. However, knowing the properties desired for the products, one skilled in the art can easily set the oxidation conditions after one or two trials.

The preferred relatively low molecular weight polyethylenes, which may be oxidized to form the preferred additives of this invention, are commercially available, and are sold essentially for blending with paraffin waxes to form paper coating compositions. The oxidized polyethylenes for use in this invention may also be commercially available. Although the low molecular weight oxidized polyethylenes are the preferred additives of this invention, other oxidized low molecular weight hydrocarbon polymers derived from monoethylenically unsaturated compounds may be employed. These include low molecular weight oxidized solids derived from such hydrocarbons as propylene, butylene, isobutylene, etc.

This invention provides polyethylene structures which display a marked improvement in heat-sealability as shown by high heat-seal strength. Furthermore, the polyethylene structures are more readily heat-sealed to form seals of substantial strength at lower heat-sealing temperatures than used heretofore.

As mentioned previously, the most important application of this invention is to polyethylene structures, particularly film, whose surface adhesion has been improved by so-called printability treatment. It is believed that this printability treatment "roughens" or modifies the surface of the polyethylene structure to create thereon microscopic "hills" not detectable by touch and not visible to the naked eye. A polyethylene film surface is considered to be satisfactorily roughened if the surface of the film contains substantially uniformly distributed "hills or mounds," each individual hill or mound having a diameter, as measured parallel to the film surface, of at least 0.05 micron to 1 micron, and usually between 0.05 micron to 0.5 micron. The elevation or height of these hills or mounds relative to the "flat" areas, i.e., areas which appear to be relatively untreated, is seldom greater than 0.2–0.5 micron, and usually not greater than 0.25 micron. As a general rule, the printability treatments do not carve out areas of the film surface to form depressions therein, but rather form hills or mounds having elevations relative to the untreated film surface. Besides improving printability (adhesion to printing inks), these treatments tend to improve the adhesive qualities of the surface of polyethylene structures to organic coatings in general. However, as mentioned previously, these treatments reduce the ability of polyethylene to adhere to itself when pressure and heat are applied.

For purposes of this invention, the adhesiveness of the surface of the polyethylene structure may be improved by any of a number of known expedients. These include superficial treatment of the polyethylene structure with chlorine gas described in U.S. Patent No. 2,502,481 to Henderson; treatment in a saturated solution of sodium dichromate in concentrated sulfuric acid, in U.S. Patent No. 2,668,134 to Horton. U.S. Patent No. 2,632,921 to Kreidl discloses a process of subjecting the surface of the polyethylene structure to a temperature above about 60° C. while maintaining the underlying parts of the structure at a temperature below about 50° C. Similarly, U.S. Patent No. 2,648,097 to Kritchever discloses exposing the surface to a gas flame while the opposite surface is supported on a cool drum. Other techniques involve treating the surface with ozone while maintaining the structure at temperatures above 150° C.; that is, the molten structure immediately after extrusion (in the air gap) may be treated with a gas containing ozone. This process is described and claimed in a copending application, U.S. Serial No. 323,271, filed November 29, 1952, by L. E. Wolinski. L. E. Wolinski has other patents and applications that involve treatment with ozone: U.S. Patent No. 2,715,075 relates to treatment in the presence of ozone and a halogen or hydrogen halide; U.S. Patent No. 2,715,076 relates to treatment with ozone in the presence of nitrous oxide; U.S. Serial No. 323,274, filed November 29, 1952, now U.S. Patent 2,805,960, relates to treatment with ozone at a temperature of at least 150° C. followed by quenching the structure in an aqueous solution containing a halogen or halogen acid; and U.S. Serial No. 323,275, filed November 29, 1952, now U.S. Patent 2,801,446, relates to treatment with ozone at a temperature of at least 150° C. followed by quenching the structure in a bath containing a conditioning agent such as hydrogen peroxide, nitrous acid, alkaline hyprochlorites, concentrated nitric acid or mixtures of concentrated nitric acid and concentrated sulphuric acid. Treating the molten polyethylene structure, maintained at a temperature above 150° C., with nitrous oxide is described in U.S. Patent 2,715,077 to L. E. Wolinski. The adhesiveness of the surface of polyethylene may also be improved by quenching a freshly extruded film in an aqueous bath containing a halogen or a halogen acid as described in copending application U.S. Serial No. 347,391, filed April 7, 1953, now U.S. Patent 2,801,447, by L. E. Wolinski. The polyethylene structure may be heated with a special conditioning agent such as hydrogen peroxide, concentrated nitric acid, nitrous acid, alkaline hypochlorites, or mixtures of concentrated nitric acid and concentrated sulphuric acid, as described in copending application U.S. Serial No. 487,701, filed February 11, 1955, now U.S. Patent 2,878,519, by L. E. Wolinski. The use of high voltage stress accompanied by corona discharge, as disclosed in British Patent Nos. 715,914 and 722,875, may also be used. Surfaces of relatively high-density polyethylene structures may be made more adhesive by quenching a freshly formed structure after extruding at a temperature of at least 325° C. as described in U.S. Serial No. 506,660, filed May 6, 1955, by I. Swerlick, and now abandoned.

Specific embodiments of the present invention are presented in the following examples, Example I representing the best mode contemplated for performing the invention. In all the examples except Example V, Bakelite DYNH–3 polyethylene resin was used. This particular resin has its lower temperature of the crystalline melting point range at about 95° C., an optical melting point of 109° C., a density of about 0.92 gram/cc. and a weight average molecular weight of 750,000–1,000,000.

The oxidized polyethylene products used as additives were prepared by two methods:

Additive A, composed of oxidized polyethylene products having a softening temperature of 52° C. and an average normal boiling temperature well above 109° C. (not distillable at normal pressure nor at a reduced pressure of 0.5 millimeter), was prepared by treating polyethylene of 1000–2000 weight average molecular weight with an ozone/oxygen mixture. The mixture, containing 2% ozone by volume, was reacted with the polyethylene for two hours at 150° C.

Additive B, composed of oxidized polyethylene products having a softening temperature of 68° C. and an average normal boiling temperature well above 109° C. (not distillable at normal pressure nor at a reduced pressure of 0.5 millimeter), was prepared by treating polyethylene of 1000–2000 weight average molecular weight with an acidic oxidizing agent. Specifically, the polyethylene was treated with an aqueous solution of 69% nitric acid for 3 hours at 90° C.

EXAMPLE I

A mixture of polyethylene resin flake and 5%, based on the weight of the resin, of Additive A was melt blended in a Banbury mixer at a temperature ranging from 180° C. to 200° C. The blend was transferred to a rubber mill where it was milled at 145° C.–150° C. to form a sheet. The sheet was chipped into flakes and fed to an extrusion apparatus.

The blend was remelted in the extrusion apparatus and extruded at 285° C. in the form of a film through a six inch air gap onto a rotating chromium quench roll. The roll was maintained at about 50° C. by passing water through the interior of the roll.

During its passage through the air gap, the molten polyethylene film underwent a printability treatment. The air gap was enclosed by a treating chamber. An ozone/oxygen mixture, containing about 1.2% ozone by volume, was passed through the chamber to contact one surface of the polyethylene film as described in U.S. Serial No. 323,271. The ozone-oxygen mixture passed through the chamber at rates of 0.49 cu. ft./min. and 0.83 cu. ft./min. while the polyethylene film was led through the chamber at about 22 ft./min.

The properties of the resulting film, compared to control films, are given in the following table.

Table 1

| Additive (percent) | Ozone/oxygen rate (cu.ft./min.) | Heat-seal strength (grams/inch) | Printability |
|---|---|---|---|
| 5% A | 0.49 | 1,400 | Printable. |
| 5% A | 0.83 | 1,330 | Do. |
| None (Control) | 0.49 | 1,036 | Do. |
| Do | 0.83 | 1,036 | Do. |
| Do | None | 1,400 | Non-printable. |

*Heat-seal strength* was measured in the following manner. The film samples were first cut into 6″ squares. Squares from the same sample were then superimposed and sealed along one edge with a steel bar 3½″ long and ⅛″ wide at a temperature of 200° C. The seals were performed by using a dwell time of 0.15 second and a pressure of 10 lbs./sq. in. The heat-seals were made by sealing a surface that had undergone a printability treatment to a surface that had not, in a direction transverse to the direction in which the film was extruded. After heat-sealing, the connected squares were cut into strips 3″ long and ½″ wide. The free ends of the heat-seal strips were then pulled apart in a tensile testing apparatus at a rate of 100% per minute. The strength of the heat-seal, expressed in grams/in. of width represents the highest force necessary to pull the strips apart.

*Printability* was determined by applying "Excelobrite" W-500, an ink manufactured by Bensing Brothers & Deeney, to the surface of the film by a commercial ink spreader. The spreader was composed of a steel rod having fine wires wrapped around it and produced a plurality of fine white lines on the surface of the film. The ink was dried by exposure for 3 minutes to a temperature of 60° C. After the ink cooled to room temperature, a strip of pressure-sensitive tape was applied to the film surface and pressed firmly. The strip was then pulled from the surface of the film and examined to determine whether any ink was removed. If ink were removed, the structure was classified as "non-printable."

EXAMPLE II

Example I was re-run except for the use of 1%, 5% and 10% of Additive B.

The properties of the resulting film, compared to control films, are given in the following table.

Table 2

| Additive (percent) | Ozone/oxygen rate (cu.ft./min.) | Heat-seal strength (grams/inch) | Printability |
|---|---|---|---|
| 1% B | 0.49 | 1,400 | Printable. |
| 1% B | 0.83 | 1,232 | Do. |
| 5% B | 0.49 | 1,386 | Do. |
| 5% B | 0.83 | 1,442 | Do. |
| 10% B | 0.49 | 1,288 | Do. |
| 10% B | 0.83 | 1,218 | Do. |
| None (Control) | 0.49 | 1,036 | Do. |
| Do | 0.83 | 1,036 | Do. |
| Do | None | 1,400 | Non-printable. |

In the following two examples heat-seal strength was measured at the temperatures indicated in Tables 3 and 4. The film strips were heat-sealed in the direction of extrusion but were pulled apart in a direction transverse to the direction of extrusion.

EXAMPLE III

Blends of polyethylene resin and the additives were melt extruded in the form of films through a 6 inch air gap into a water quench at 60° C. to solidify the film. The film was then fed onto a grounded steel drum rotating at a circumferential speed of 35 ft./minute. A Tesla coil was held ⅛″ above the drum and discharged 30,000 volts across the width of the polyethylene film in a manner similar to that described in British Patent No. 715,914.

The properties of the resulting printable films, compared to a control film that contained no additive but received the electrical discharge treatment, are given in the following table.

Table 3

| Additive (percent) | Heat-seal strength (grams/inch) | |
|---|---|---|
| | 160° C. | 200° C. |
| 1.0% A | 714 | 1,154 |
| 0.4% B | 890 | 1,034 |
| None (Control) | 425 | 925 |

EXAMPLE IV

Blends of polyethylene resin and the additives were melt extruded in the form of a film through a 6 inch air gap into a water quench at 60° C. to solidify the film. The film was then treated at a speed of 100 ft./min. with a propane/air flame at a flame temperature of about 1900° C., the burner being about ³⁄₃₂″ from the surface of the film. The top surface of the film attained a temperature over 200° C. while the under surface passed over a chromium roll maintained at 2° C. The details of this printability treatment are given in U.S. Patent No. 2,648,097.

The properties of the resulting printable films, compared to a control film that contained no additive but received the flame treatment, are given in the following table.

Table 4

| Additive (percent) | Heat-seal strength (grams/inch) | |
|---|---|---|
| | 160° C. | 200° C. |
| 1.0% A | 340 | 1,006 |
| 0.4% B | 200 | 886 |
| None (Control) | 38 | 380 |

In the following example, the special additive was applied to the surface of polyethylene film prior to the printability treatment, instead of being incorporated in the polyethylene composition prior to extrusion.

EXAMPLE V

Polyethylene film was prepared as described in Example I from a blend of resins containing 50% by weight "Bakelite" DYNH-3 and 50% "Alathon" 14. The blended resin had a density of 0.917 gram/cc., a weight average molecular weight of between 750,000 and 1,000,000 and a crystalline melting point range from about 95° C. to an optical melting point of 108° C.

The additive, Additive B, was dissolved in benzene. The film was dipped into the solution, dried by circulating air at about 60° C. to form a film coated with 0.15% of the additive.

A second film, the control, which contained no additive and the coated film were both subjected to the flame printability treatment described in Example IV. The results are presented in the following table.

Table 5

Additive (percent):     Heat-seal strength (g./in.)
- 0.15% B _____ 1526
- None (control) _____ 1000

The following example indicates the importance of the present invention in improving heat-seal strength and in lowering the heat-seal temperature required, in general. In this example, the various films did not undergo any printability treatment.

EXAMPLE VI

A polyethylene film was prepared in the manner described in Example I except that a water quench bath at about 30° C. was used instead of the chromium roll. The ozone treatment was also omitted. The use of 1% of Additives A and B was compared to a control containing no additive. The results are given in the following table. The heat-seal strengths of two commercial polyethylene films (Products X and Y), containing no additives of the type disclosed herein, are also given for comparative purposes.

Table 6

| Additive (percent) | Heat-seal strength (grams/inch) | | |
|---|---|---|---|
| | 120° C. | 145° C. | 160° C. |
| Invention—1% A | 800 | | 1,047 |
| Invention—1% B | 800 | | 1,100 |
| Control—None | No seal | | 300 |
| Product X—None | | 56 | |
| Product Y—None | | 180 | |

As shown by the examples, the invention is not only useful in preparing heat-sealable, printable polyethylene packaging film, but is useful in improving the heat-seal strength of polyethylene film in general, and in lowering the temperature required for satisfactory heat-seals. In the case of printable polyethylene packaging films, the addition of the oxidation products of polyethylene in accordance with the invention serves to recover the heat-seal strength lost by the polyethylene film due to the printability treatment. The use of these special additives also tends to retard the loss of printability and heat-sealability of the polyethylene film with age such as inevitably occurs during storage prior to printing and conversion of film to bags.

Besides polyethylene film, the invention is applicable to other self-supporting structures such as filaments, rods, tubes, sheets for lamination and to supported polyethylene structures wherein polyethylene compositions containing the additives are coated on one or both sides of various base films such as cellophane, polyethylene terephthalate, polyvinylidene chloride, etc. It is applicable to polyethylene structures of normal density (0.91–0.93 gram/cc.) and to polyethylene structures of heavy density (0.94–0.96 gram/cc.); to polyethylene compositions formed by copolymerizing polyethylene with minor amounts of propylene, butylene, isobutylene, stryrene, vinyl-acetate and similar vinyl compounds; to polymethylene derived from carbon monoxide and hydrogen as U.S. Patent No. 2,652,372 to Farlow and Herrick; and to polypropylene, polybutylene and the like.

In forming polyethylene films either containing the special additives or to which the additive is later applied, a melt extrusion process is usually employed. In general, a molding powder or flake of polyethylene is fed continuously into a melt extrusion machine; the molten polyethylene is continuously extruded through a slot orifice, then through an air gap vertically downward into a quench bath or onto a quench roll maintained at a temperature from 25° C.–95° C., preferably from 30° C.–60° C. Usually, the polyethylene is extruded from a melt maintained at a temperature above 150° C. Tubing is usually extruded from a melt at a temperature within a range of 150° C.–200° C., whereas film is extruded at a temperature which may lie anywhere from above 250° C. to the degradation temperature of the polyethylene. An alternate process of forming polyethylene film which also employs molten polyethylene comprises milling molten polymer on closely spaced calender rolls to form a film which is conducted vertically downward into a quench bath. In either of these general methods of forming polyethylene film, the space between the point where the molten film leaves the slot orifice or the last calender roll and the point where the molten film enters the quench bath is termed the "air gap." During passage through the air gap, the film is usually permitted to pass uninhibited through the atmosphere; and this provides for some superficial cooling. Generally, the length of the air gap ranges from 2" to as long as 15" in some cases. In some cases as illustrated in Examples I and II, the film may be subjected to the printability treatment in the air gap. Besides forming polyethylene structures from the molten polymer, polyethylene structures may also be formed from solutions thereof in a solvent, or from dispersions of the polyethylene in an inert liquid medium such as water. Similarly, the polyethylene coatings may be applied upon other substrates from a melt, solvent solution or dispersion in a liquid medium.

The amount of additive required lies above about 0.1%, and very rarely above 10%. The precise amount will depend upon the increase in heat-seal strength desired. In cases where it is desired to recover the heat-seal strength lost by the printability treatment, the amount of additive will depend on the particular printability treatment and the extent of this treatment. In most cases, not more than about 5% of the additive need be incorporated in or applied to the surface of the polyethylene film to recover the heat-seal strength lost due to the printability treatment. In any case, the oxidation products of polyethylene should be added to the polyethylene structure or polyethylene coating composition prior to any printability treatment.

The following theory is offered to explain the surprising success of the present invention. However, this theory should not be construed as limiting the scope of the invention. It is believed that the additive when incorporated in the polyethylene composition is not completely compatible with the polyethylene resin. During the heat-sealing step, the additive tends to exude to the surface, thus plasticizing the surface of the polyethylene structure. If added to the surface, the additive also serves to plasticize the surface during the heat-sealing step. Plasticization of the surface, in turn, serves to increase the heat-sealability of the structure.

As many widely different embodiments can be made without departing from the spirit and scope of this invention, this invention is not limited except as defined in the appended claims.

What is claimed is:

1. A composition of matter comprising a polyethylene resin having a weight average molecular weight of 15,000 to 3,000,000 and 0.1%–10%, based on the weight of said resin, of the oxidation products of polyethylene, said oxidation products prepared by the oxidation of polyethylene having a weight average molecular weight of from 1,000 to below 5,000, said oxidation products having a softening temperature no greater than the lower temperature of the crystalline melting range of said resin, an average normal boiling temperature above the optical melting point of said resin and a melt viscosity lower than that of said resin at a temperature above 110° C.

2. A composition of matter comprising a polyethylene resin having a weight average molecular weight between 15,000 and 3,000,000 and 0.1%–10%, based on the weight of said resin, of the oxidation products of polyethylene, said oxidation products prepared by the oxidation of polyethylene having a weight average molecular weight of from 1,000 to below 5,000, said oxidation products having a softening temperature below 100° C., an average normal boiling temperature above 325° C. and a melt viscosity lower than that of said polyethylene resin at a temperature above 110° C.

3. A composition of matter comprising a polyethylene resin having a weight average molecular weight of 200,000 to 1,500,000 and 0.1%–10%, based on the weight of said resin, of the oxidation products of polyethylene, said oxidation products prepared by the oxidation of polyethylene having a weight average molecular weight of from 1,000 to below 5,000, said oxidation products having a softening temperature no greater than the lower temperature of the crystalline melting range of said resin, an average normal boiling temperature above the optical melting point of said resin and a melt viscosity lower than that of said resin at a temperature above 110° C.

4. A composition of matter comprising a polyethylene resin having a weight average molecular weight between 200,000 and 1,500,000 and 0.1%–10%, based on the weight of said resin, of the oxidation products of polyethylene, said oxidation products prepared by the oxidation of polyethylene having a weight average molecular weight of from 1,000 to below 5,000, said oxidation products having a softening temperature below 100° C., an average normal boiling temperature above 325° C. and a melt viscosity lower than that of said polyethylene resin at a temperature above 110° C.

5. A self-supporting film comprising a polyethylene resin having a weight average molecular weight of 15,000 to 3,000,000 and 0.1% 10%, based on the weight of said resin, of the oxidation products of polyethylene, said oxidation products prepared by the oxidation of polyethylene having a weight average molecular weight of from 1,000 to below 5,000, said oxidation products having a softening temperature no greater than the lower temperature of the crystalline melting range of said resin, an average normal boiling temperature above the optical melting point of said resin and a melt viscosity lower than that of said resin at a temperature above 110° C.

6. A self-supporting film comprising a polyethylene resin having a weight average molecular weight between 200,000 and 1,500,000 and 0.1%–10%, based on the weight of said resin, of the oxidation products of polyethylene, said oxidation products prepared by the oxidation of polyethylene having a weight average molecular weight of from 1,000 to below 5,000, said oxidation products having a softening temperature below 100° C., an average normal boiling temperature above 325° C. and a melt viscosity lower than that of said polyethylene resin at a temperature above 110° C.

7. A film-forming composition comprising an intimate blend of from about 98% to about 91%, by weight, of solid high molecular weight polyethylene resin and, correspondingly, from about 2% to about 9%, by weight, of low molecular weight oxidized polyethylene wax containing acidic groups.

8. A film-forming composition comprising an intimate blend of from about 98% to about 90%, by weight, of solid high molecular weight polyethylene resin and, correspondingly, from about 2% to about 10%, by weight, of low molecular weight oxidized polyethylene wax.

References Cited by the Examiner

UNITED STATES PATENTS

| Re. 24,062 | 9/1955 | Horton | 260—94 |
| 2,405,977 | 8/1946 | Peters | 18—57 |
| 2,461,975 | 2/1949 | Fuller | 18—57 |
| 2,504,270 | 4/1950 | MacLaren et al. | 260—28.5 |
| 2,531,408 | 11/1950 | D'Alelio | 260—41 |
| 2,698,309 | 12/1954 | Thwaites et al. | 260—28.5 |
| 2,700,027 | 1/1955 | Burson | 260—41 |

FOREIGN PATENTS

| 832,174 | 6/1938 | France. |
| 581,279 | 10/1946 | Great Britain. |

OTHER REFERENCES

Schmidt-Marliess: "Principles of High-Polymer Theory and Practice," pages 235–239, published by McGraw-Hill, New York, 1948.

MURRAY TILLMAN, *Primary Examiner.*

ALEXANDER H. BRODMERKEL, DAN ARNOLD, LEON J. BERCOVITZ, *Examiners.*

T. WILSON, D. E. PELHAM, J. A. KOLASCH, E. B. WOODRUFF, *Assistant Examiners.*